(12) United States Patent
Rolin et al.

(10) Patent No.: US 10,318,766 B2
(45) Date of Patent: Jun. 11, 2019

(54) METHOD FOR THE SECURED RECORDING OF DATA, CORRESPONDING DEVICE AND PROGRAM

(71) Applicant: INGENICO GROUP, Paris (FR)

(72) Inventors: Christian Rolin, Guilherand Granges (FR); Laurent Muller, Meyzieu (FR); Mohammed Bellahcene, Lyons (FR); Jessica Royer, Valence (FR); Jean-Christophe Pommaret, Tain-l'Hermitage (FR)

(73) Assignee: INGENICO GROUP, Paris (FR)

( * ) Notice: Subject to any disclaimer, the term of this patent is extended or adjusted under 35 U.S.C. 154(b) by 69 days.

(21) Appl. No.: 15/344,067

(22) Filed: Nov. 4, 2016

(65) Prior Publication Data
US 2017/0132435 A1 May 11, 2017

(30) Foreign Application Priority Data

Nov. 6, 2015 (FR) .................................... 15 60682

(51) Int. Cl.
| | |
|---|---|
| *G06F 11/30* | (2006.01) |
| *G06F 21/78* | (2013.01) |
| *H04L 9/32* | (2006.01) |
| *G06F 12/14* | (2006.01) |
| *G06F 21/62* | (2013.01) |
| *G06F 21/64* | (2013.01) |
| *H04L 9/08* | (2006.01) |

(52) U.S. Cl.
CPC .......... *G06F 21/78* (2013.01); *G06F 12/1408* (2013.01); *G06F 21/62* (2013.01); *G06F 21/64* (2013.01); *H04L 9/0861* (2013.01); *H04L 9/0866* (2013.01); *H04L 9/3236* (2013.01)

(58) Field of Classification Search
CPC ...... G06F 12/1408; G06F 21/62; G06F 21/64; G06F 21/78; H04L 9/0861; H04L 9/0866; H04L 9/3236
USPC ......................................................... 713/193
See application file for complete search history.

(56) References Cited

U.S. PATENT DOCUMENTS

| | | | |
|---|---|---|---|
| 2002/0147918 A1 | 10/2002 | Osthoff et al. | |
| 2003/0179885 A1* | 9/2003 | Gentry | ................. H04L 9/0836 380/277 |

(Continued)

OTHER PUBLICATIONS

Preliminary Search Report with regard to FR 1560682 dated Jul. 20, 2016.

(Continued)

*Primary Examiner* — Samson B Lemma
(74) *Attorney, Agent, or Firm* — BCF LLP

(57) ABSTRACT

A method for the secured recording of data, implemented in a data-recording device having a first non-secured memory and a second secured memory, is disclosed. The method has the steps of: obtaining a derived key corresponding to the data in the second memory from a root key recorded in the second memory; encrypting data using the derived key, delivering encrypted data; recording the encrypted data in the first memory; determining a hash imprint of said data; recording said hash imprint in a hash file recorded in the first memory; recording a general hash imprint, representing the content of the hash file comprising said hash imprint, in the second memory; and eliminating the data in the second memory.

12 Claims, 5 Drawing Sheets

(56) References Cited

U.S. PATENT DOCUMENTS

| | | | |
|---|---|---|---|
| 2005/0020315 A1* | 1/2005 | Robertson | H04M 1/673 455/565 |
| 2007/0153580 A1* | 7/2007 | Luft | G06F 21/606 365/185.19 |
| 2008/0310628 A1* | 12/2008 | Fujioka | G06F 11/1469 380/201 |
| 2009/0328218 A1* | 12/2009 | Tsurukawa | G06F 21/64 726/23 |
| 2012/0002816 A1* | 1/2012 | Tian | H04L 9/0822 380/270 |
| 2012/0166757 A1* | 6/2012 | Volvovski | G06F 17/30 711/206 |

OTHER PUBLICATIONS

Hu et al., "A fast real-time memory authentication protocol", Proceedings of the 3rd ACM Workshop on Scalable Trusted Computing, 2008, pp. 31-40.

* cited by examiner

METHOD FOR THE SECURED RECORDING OF DATA, CORRESPONDING DEVICE AND PROGRAM

1. CROSS-REFERENCE

The present application claims priority to French Patent Application No. 1560682, filed Nov. 6, 2015, the entirety of which is incorporated herein by reference.

2. FIELD OF THE INVENTION

The invention relates to the field of the securing of data and relates more particularly to the secured recording of data in a data-recording device.

3. PRIOR ART

The recording of data in computer terminals and apparatuses such as computers, servers, mobile telephones, connected objects, etc., today presents a major challenge given the ubiquitous presence of this type of apparatus and the continued expansion of the volume of data being generated daily in both the professional sphere and the domestic sphere. To meet this problem of data recording, major progress has been made in the capacity of memories to record large volumes of data in a limited space.

There is a presently existing need more particularly for the secured recording in memory of sensitive data, to which access must be controlled. Encryption techniques have thus been developed in recent years to ensure the confidentiality of the data recorded in the data-recording devices. Thus, identification and/or authentication methods are now frequently implemented to control access to sensitive data in the memory of a terminal. These memories, called secured or protected memories, thus enable the user to record data in such a way that he can later access it in full security.

However, the implementing of such secured memories, in terminals such as computers or mobile telephones for example, presents certain problems. Sensitive data are generally recorded in secured small-sized memories as the application of these memories entails major costs as compared with those of classic non-protected memories. In a known way, a terminal can include a secured memory zone in which a user's most sensitive data are recorded, along with a non-secured memory zone recording the rest of the data which do not present any particular security risk. This type of arrangement is found classically in payment terminals comprising a protected memory to record confidential data and a non-protected memory to record less sensitive data.

The reduced size of the secured memory zones in terminals and more generally in data-recording devices currently raises a problem since the amount of secured memory space needed to record all the sensitive data to which access must be protected is not always available.

The increasing use of confidential data in modern apparatuses and processes calls therefore for a new system guaranteeing secured recording for a large volume of data in a data-recording device, while at the same time limiting the use of secured memory space. There is in addition a need for a secured recording solution that reliably ensures the integrity of the sensitive data, especially during access by a user to the data in question.

4. SUMMARY

It is one of the aims of the invention to overcome the insufficiencies and drawbacks of the prior art.

To this end, the disclosure proposes a method for the secured recording of data implemented in a data-recording device comprising a first non-secured memory and a second secured memory, the method comprising the following steps:
- obtaining a derived key corresponding to the data recorded in the second memory from a root key recorded in the second memory;
- encrypting data using the derived key, delivering encrypted data;
- recording the encrypted data in the first memory;
- determining a hash imprint of said data;
- recording said hash imprint in association with the data in a hash file recorded in the first memory;
- recording a general hash imprint representing the content of the hash file comprising said hash imprint, in the second memory; and
- eliminating the data in the second memory subsequently to said recording of encrypted data in the first memory.

The present technique advantageously enables the secured recording of data in the data-recording device while at the same time limiting the memory space used for this purpose in the secured memory of said device. To this end, the data are recorded in encrypted form in the non-secured memory. These same data are removed from the secured memory in order to gain memory space. The root key, from which the data are encrypted, is recorded in the secured memory of the data-recording device so as to protect access to said root key.

As explained here below, the implementing and recording of the hash file and of the general hash imprint furthermore enables reliable checks on the integrity of the data recorded in encrypted form in the non-secured memory.

According to one particular embodiment, after it has been obtained, the derived key is recorded in the second memory, the method furthermore comprising a step for eliminating the derived key from the second memory after the encryption of said data. It is thus possible to further save on space in the secured memory of the data recording device.

According to one particular embodiment, the root key is generated randomly once and for all in the data-recording device. In this way, it is more difficult for a malicious third party to fraudulently retrieve the root key.

According to one particular embodiment, during the step for obtaining, the derived key is obtained from:
- a user identifier representing a user of the data-recording device; and
- a data identifier.

According to one particular feature, the derived key is thus linked to a user and to the data in question.

According to one particular embodiment, during said recording of the encrypted data, said encrypted data are recorded in the first memory in the form of an encrypted file to which a file name is assigned comprising the user identifier and the data identifier. It is thus possible to easily retrieve an encrypted file comprising, in encrypted form, the data to which it is desired to obtain access.

According to one particular embodiment, the method comprises, following said recording of the hash imprint in the hash file, a recording of a copy of the hash file in a secured back-up memory of the data-recording device. In one particular example, this back-up memory is included in the second secured memory. If it is subsequently detected that the hash file recorded in the first memory does not have integrity, the recording device can then retrieve in a secured way the copy of the hash file in the back-up memory. In one particular example, in the event of detection of an attack on the integrity of the hash file in the first memory, the recording device then replaces said hash file in the first memory by said copy coming from the back-up memory.

The disclosure also proposes a method for the secured retrieval of data implemented in a data-recording device comprising a first non-secured memory and a second secured memory, the method comprising:

a verification of the integrity of a hash file recorded in the first memory from a general hash imprint recorded in the second memory;

then, if the hash file is detected as having integrity, the method furthermore comprises, upon reception of a request for access to data, the following steps:

obtaining a derived key, corresponding to encrypted data recorded in the first memory, from a root key recorded in the second memory;

decrypting encrypted data using the obtained derived key so as to retrieve said data;

recording said data in the second memory;

determining the hash imprint of said data;

verifying the integrity of the data recorded in the second memory by comparing the determined hash imprint for the data with a hash imprint recorded in the hash file in association with said data; and authorization of access to the data in the second memory in response to said access request, only if the data have been determined as having integrity.

The present technique thus enables access to data recorded in the non-secured memory without compromising the confidentiality of said data. During the method for the secured retrieval of the data, at no time is the data presented in a non-encrypted form (clear text form) in the non-secured memory. The invention furthermore enables the reliable checking of the integrity of the data to which access can be had if need be in the secured memory.

According to one particular embodiment, the method comprises a step for obtaining a user identifier representing a user of the data-recording device and a data identifier, in which the derived key is obtained from the root key by using the user identifier and the data identifier.

Advantageously, since the user identifier and the data identifier are constant, the derived key determined from the root key is always the same.

According to one particular embodiment, the method comprises, subsequently to an access to data, the execution of steps for encrypting data as encrypted data, recording encrypted data, determining a hash imprint, recording the hash imprint, recording the general hash imprint and eliminating data as defined here above in the secured recording method.

The invention then advantageously enables the secured recording, in the non-secured memory, of the data to which access is had in the secured memory.

According to one particular embodiment, the method furthermore comprises the following steps after an access by the user to the data in the second memory:

determining a second hash imprint of said data following said access; and comparing said second hash imprint with a hash imprint recorded in the hash file in association with the data in order to detect whether the data have been modified during said access;

wherein the method comprises the execution of the steps of encrypting, recording encrypted data, determining a hash imprint, recording said hash imprint and recording a general hash value as defined here above in the secured recording method, only if it has been detected that the data have been modified during their access.

It is thus possible to prevent the superfluous repetition of certain steps of the secured recording method following access to data in the secured memory of the terminal. This results in a gain in time and in efficiency as well as a saving of resources used in the data-recording device.

In one particular embodiment, the different steps of the secured method for recording data and of the method for the secured retrieval of data are determined by computer program instructions.

Thus the present technique is also aimed at providing a computer program on an information carrier (or recording medium), this program being capable of being implemented in a data-recording device, or more generally in a computer, this program comprising instructions adapted to implementing the steps of a method for the secured recording of data and/or a method for the secured retrieval of data as defined here above This program can use any programming language whatsoever, and can be in the form of source code, object code or intermediate code between source code and object code, such as in a partially compiled form or in any other desirable form whatsoever.

The invention also seeks to provide an information carrier readable by a data processor and comprising instructions of a program as mentioned here above.

The information carrier can for example be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by radio or by other means. The program according to the invention can especially be uploaded to an Internet type network.

As an alternative, the information support can be an integrated circuit into which the program is incorporated, the circuit being adapted to executing or being used in the execution of at least any one of the methods in question.

The present technique furthermore relates to a data-recording device comprising:

a first non-secured memory;

a second secured memory;

an obtaining module to obtain, from a root key recorded in the second memory, a derived key corresponding to data recorded in the second memory;

an encryption module for the encryption, using the derived key, of said data so as to deliver encrypted data;

a first recording module for the recording of the encrypted data in the first memory;

a determining module to determine a hash imprint of said data;

a second recording module to record said hash imprint, in association with the data, in a hash file recorded in the first memory;

a third recording module for the recording, in the second memory, of a general hash imprint representing the content of the hash file comprising said hash imprint; and an elimination module for eliminating the data in the second memory after said recording of the encrypted data in the first memory.

According to one particular embodiment, said device is such that:

the obtaining module is configured for the recording, in the second memory, of the derived key obtained from the root key; and the elimination module is configured to eliminate the derived key recorded in the second memory after the encryption of said data by the encryption module.

It must be noted that the different embodiments defined here above with reference to the method for the secured recording of data and the method for the secured retrieval of data, as also the advantages associated with these methods, can be applied by analogy to the secured recording device of the invention.

According to one embodiment, the invention is implemented through software and/or hardware components. In this respect, the term "module" can correspond in this document equally well to a software component as to a hardware component or again to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, gateway, router, etc.) and is capable of accessing the hardware resources of this physical entity (memories, recording media, communications buses, input/output electronic boards, user interfaces, etc.)

In the same way, a hardware component corresponds to any element of a hardware unit capable of implementing a function or a set of functions as described here above for the module concerned. It can be a programmable hardware component or a component with an integrated processor for the execution of software, for example an integrated circuit, a smartcard, a memory card, an electronic board for the execution of firmware, etc.

Each component of the previously described system naturally implements its own software modules.

It must be noted that the different embodiments mentioned here above can be combined with each other to implement the invention.

5. FIGURES

Other features and advantages shall appear more clearly from the following description of a preferred embodiment, given by way of a simple illustrative and non-exhaustive example and from the appended drawings, of which:

6. DESCRIPTION

As indicated here above, the invention relates to the securing of data and relates more particularly to the secured recording of data in a data-recording device.

As explained here above, the general principle of the proposed technique lies in the use of a data-recording device comprising a first non-secured memory and a second secured memory in order to record data in a secured manner. More particularly, the principle consists of the recording of data in encrypted form in the non-secured memory so that the data is accessible if need be without compromising its confidentiality. When no access to these data is needed, then these data are not present in the secured memory of the device, in order to save on memory space in this secured memory. If, by contrast, the access to data is needed, then the encrypted data recorded in the non-secured memory are decrypted and recorded temporarily in the secured memory so as to enable access to data while ensuring its confidentiality. A mechanism for checking integrity can furthermore be implemented in the recording device in order to verify that the decrypted data in the secured memory have full integrity.

The data for which access has been secured by means of the invention can be any unspecified data, especially in terms of nature and form.

Other features and advantages of the present techniques will appear from the examples of embodiments described here below with reference to the drawings mentioned here above.

Unless otherwise indicated, the elements common or similar to several figures relate to the same reference signs and have identical or similar characteristics so that these common elements are generally not described again for the sake of simplicity.

Figure 1:
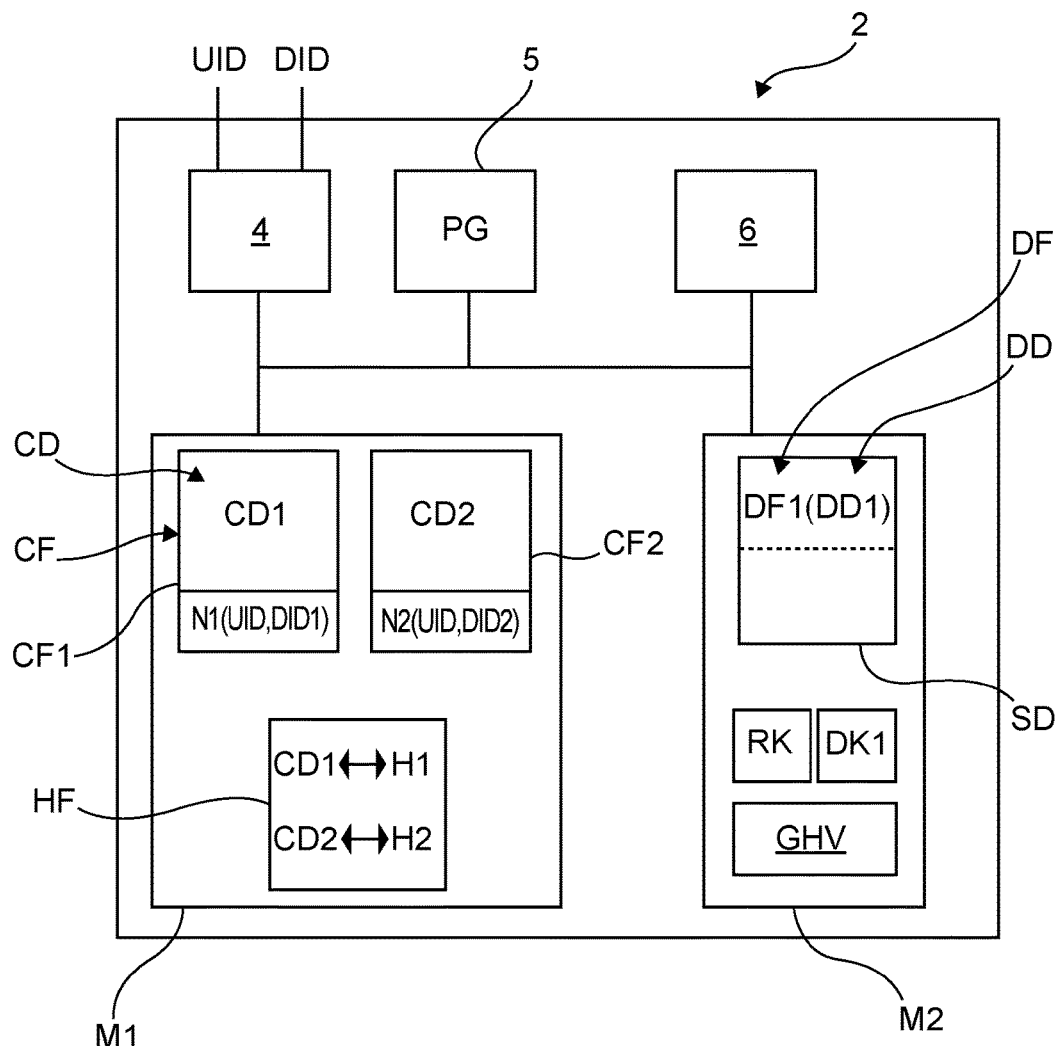
FIG. 1 is a schematic view of the structure of a device for the secured recording of data, according to one particular embodiment.

FIG. 1 is a schematic representation of the structure of a data-recording device 2 compliant with a particular embodiment. The device 2 (here below called a "terminal") is a payment terminal in this particular case. Naturally, other examples can be envisaged within the framework of the invention.

It will be noted that certain constituent elements that generally form part of a terminal such as a payment terminal have been deliberately omitted because they are not necessary for an understanding of the present technique.

More particularly, the terminal 2 herein comprises a control unit 4 and non-volatile memories 5, 6, M1 and M2.

Figure 3:
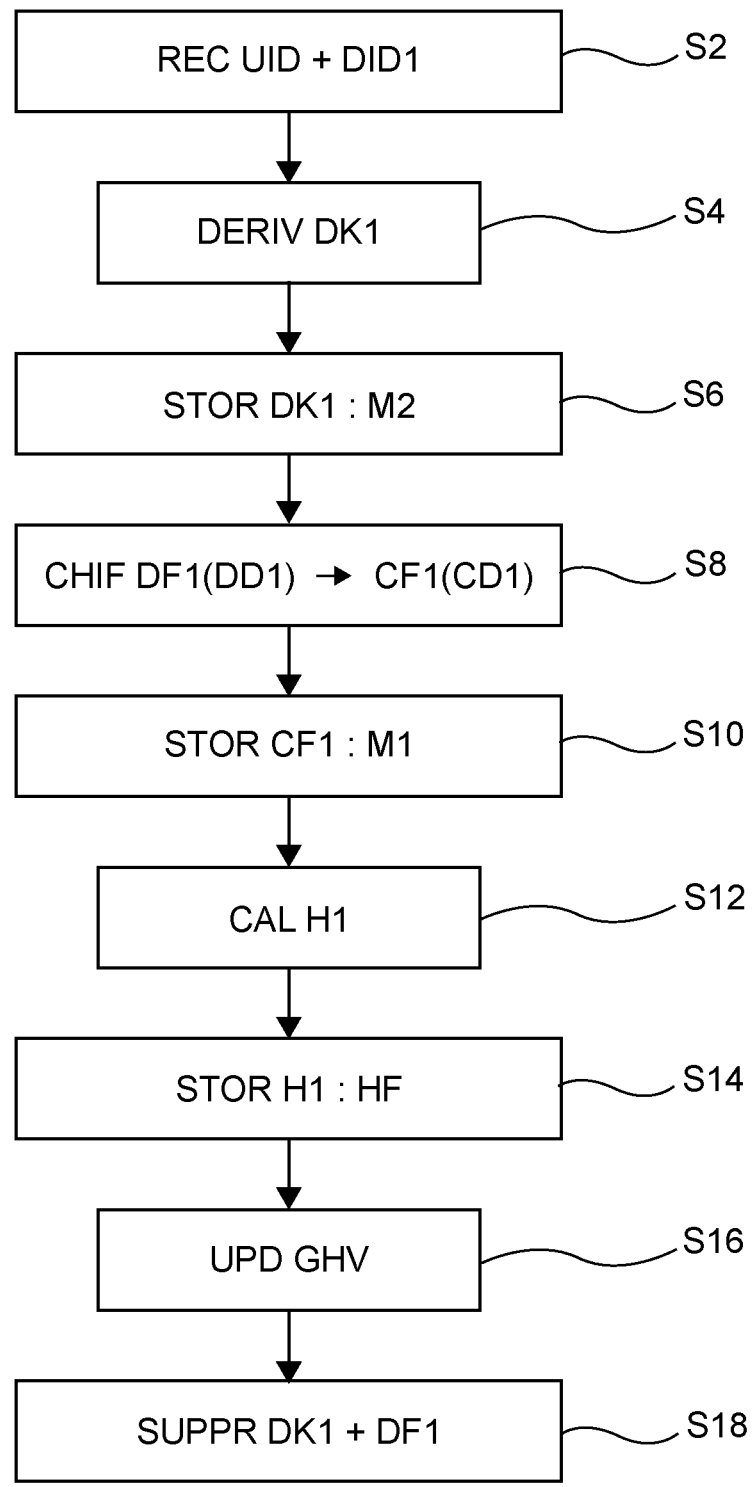
FIG. 3 is a flowchart presenting the steps of a method for the secured recording of data according to one particular embodiment of the invention.

The memory 5 is a rewritable non-volatile memory or a read-only memory (ROM), this memory constituting a recording support compliant with one particular embodiment of the invention, readable by the terminal 2, and on which a computer program PG, compliant with a particular embodiment of the invention, is recorded. This computer program PG comprises instructions to execute the steps of a method for the secured recording of data and a method for the secured retrieval of data, according to one particular embodiment of the invention. The main steps of these methods are shown in FIG. 3 described here below.

Figure 2:
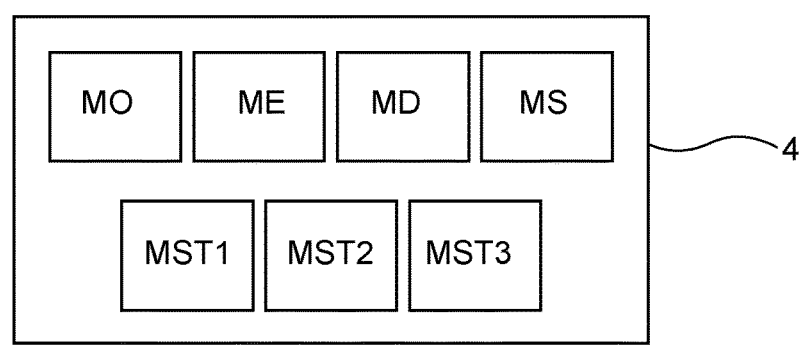
FIG. 2 is a schematic representation of the modules implemented in the data-recording device represented in FIG. 1.

The control unit 4 (a processor in this example) driven by the computer program PG herein implements a certain number of modules represented in FIG. 2, namely: a module for obtaining MO, an encryption module ME, a determining module MD, a first recording module MST1, a second recording module MST2, a third recording module MST3 and an elimination module MS. An example of implementation of these modules shall be described here below.

In addition, the processor 4 is capable of inputting a user identifier UID and a data identifier DID. The use of the identifiers UID and DID shall be described in detail further below in one particular implementation.

The memory M2 is a secured (or protected) memory. In the present description, the term "secured memory" is understood to mean a memory for which the access to the content is protected by an appropriate security mechanism. Such a mechanism makes it possible to verify the identity and/or authenticity of a requesting party wishing to access data recorded in the secured memory in question. Typically, a secured memory is attached to a secured processor capable of implementing a data-securing mechanism in the memory, comprising for example the erasure of the data in the event of an attack on the integrity of the data. The security mechanism can also be a hardware mechanism (a physical layer overlapping the memory in order to protect its reading, etc.).

The memory 6 is a rewritable non-volatile memory used as a back-up memory. It will be understood however that the use of such a back-up memory is not obligatory for the implementing of the invention.

In the example considered here, the back-up memory 6 is a secured memory in the same way as the memory M2. The memory 6 can be included in the secured memory M2 or alternatively it can be external to the secured memory M2.

The memory M1 by contrast, is a non-secured memory. In other words, the access to the content of the memory M1 is not protected unlike the access to the content of the memory M2.

The memory M1 is capable of recording data DD in encrypted form (denoted as CD in encrypted form), for example in the form of at least one encrypted file CF in order to prevent access to said data DD by any unauthorized individuals. It will be understood however that said encrypted data CD in the memory M1 does not obligatorily have to be recorded in file form. It is indeed possible, within the framework of the present technique, to envisage the recording of encrypted data CD in the non-secured memory M1 that does not have the form of a file. It will be assumed however, in the examples of embodiments that follow, that each piece of encrypted data CD recorded in the non-secured memory M1 is contained in an encrypted file CF.

We shall consider for example the case where the memory M1 comprises an encrypted file CF1 containing encrypted data CD1 as well as an encrypted file CF2 containing encrypted data CD2. In this example, the encrypted data CD1 and CD2 are respectively data DD1 and DD2 in encrypted form.

Besides, a file name N1, N2 is assigned respectively to the encrypted file CF1, CF2. Again in this example, each file name comprises the user identifier UID of a user and the identifier DID of the data DD contained in encrypted form in the file CF in question. In this example, the file name N1 comprises the user identifier UID and the data DD1 identifier DID1. Similarly, the file name N2 herein comprises the same user identifier UID and the data DD2 identifier DID2.

The memory M1 furthermore comprises a hash file HF in which it is possible to record a respective hash imprint H in association with each piece of data DD (or set of data) of the memory M1 recorded in encrypted form in the memory M1. Each hash imprint (or hash value) is obtained by applying a hash function to the corresponding data DD. The same hash function is used to determine the hash imprint of each set of data that is recorded in encrypted form in the non-secured memory M1. A hash imprint H is thus representative of the data contained in the encrypted file CF considered without its being possible to determine either the content of the file CF in question or its value in clear text form from this hash imprint. In the example shown in FIG. 1, the hash file HF comprises the hash imprint H1 associated with the data DD1 as well as the hash imprint H2 associated with the data DD2.

The secured memory M2 is also capable of recording data DD, the confidentiality of which is to be preserved. The data DD are herein recorded in the secured memory M2 in non-encrypted form in non-encrypted files DF. As indicated here below, we consider for example an initial state where the non-encrypted file DF1 comprising data DD1 is recorded in the memory M2.

It will be understood however, that said data DD should not obligatorily be recorded in file form during the recording in the secured memory M2. It is possible indeed, in the context of the present technique, to envisage the recording of data DD, in the secured memory M2, that do not take the form of a file. It will be assumed however, in the embodiments that follow, that each piece of data DD recorded in the memory M2 is contained in a file DF.

The memory M2, besides, is capable of recording a cryptographic root key RK, a cryptographic key (denoted as DK1 for example) derived from the root key RK as well as a general hash imprint GHV. The purpose and use of these parameters shall be described in greater detail here below in one particular implementation.

More particularly, the general hash imprint GHV is a hash imprint obtained by applying a hash function from the content of the hash file HF. Thus, the value of GHV at a given point in time represents the content of the hash file HF at the point in time considered. Any addition, elimination or modification of a hash imprint H in the hash file HF therefore has the consequence of in modifying the value of GHV in the memory M2 as explained in greater detail further below.

One particular embodiment of the invention is now described with reference to FIG. 3. More specifically, the terminal 2 implements a method of secured recording of data in executing the computer program PG.

An initial state is considered in which a non-encrypted file DF1 comprising data DD1 in the non-encrypted state is recorded in the secured memory M2. It is furthermore assumed that no encrypted file CF is recorded in the memory M1 and that the hash file HF is vacant.

It is also assumed that the cryptographic root key RK is preliminarily generated in the terminal 2, for example randomly, and recorded in the memory M2 as indicated here above. In one particular example, the root key RK is generated randomly once and for all during the lifetime of the terminal 2.

During an obtaining step S2, the processor 4 obtains a user identifier UID of a user of the terminal 2 as well as an identifier DID1 of the data DD1. In one particular example, the terminal 2 can receive the identifiers UID and DID1 from the exterior of said terminal. As an alternative, the terminal 2 can determine at least one of the identifiers UID and DID1. The determining by the terminal 2 especially of the user identifier UID1 prevents a third party from accessing the data DD of another user in the terminal T1. The way in which the processor 4 determines or retrieves the user identifier UID1 and the identifier DID1 can be adapted to the context of use.

Then, from the root key RK recorded in the secured memory M2, the obtaining module MO determines (S4) a cryptographic key DK1, called a "derived key" corresponding to the recorded data DD1 recorded in the memory M2. In the example envisaged here, the obtaining module MO obtains the derived key DK1 from the root key RK by using the user identifier UID and the identifier DID1 of the data DD1.

The obtaining module MO also records (S6) the derived key DK1 in the secured memory M2 so that this key DK1 can be used subsequently.

During an encryption step S8, the encryption module ME encrypts (S8) the file DF1 comprising the data DD1 using the derived key DK1 so as to obtain an encrypted file CF1 comprising the data DD1 in encrypted form (denoted as CD1). To this end, the encryption module ME uses, for example, a symmetrical encryption algorithm to encrypt the file DF1. An asymmetrical encryption algorithm can however be envisaged in the context of the invention. It is assumed here that the same encryption algorithm is used to encrypt each data file in this method.

The encrypted file CF1 is recorded (S10) by the first recording module MST1 in the memory M1. In the example described here, the name N1 comprising the user identifier UID and the data DD1 identifier DID1 is assigned to the encrypted file CF1.

The determining module MD also determines (S12) a hash imprint H1 of the data DD1 included in non-encrypted form in the file DF1. As already explained, this hash imprint H1 represents data DD1 contained in the non-encrypted file DF1.

The hash imprint H1 is furthermore recorded (S14) by the second recording module MST2 in the hash file HF in association with the data DD1. In one particular case, each hash imprint H recorded in the hash file HF is associated with the identifier DID of the corresponding data DD (i.e. DID1 in the present case).

According to one alternative embodiment, following the recording step S14, the processor 4 can also record a copy of the hash file HF in the secured back-up memory 6. This back-up makes it possible, if need be, to subsequently retrieve the hash imprint H1 in a secured manner as described here below.

Again, in the embodiment envisaged here, once the step S14 has been performed, the third recording module MST3 determines and then records (S16), in the secured memory M2, a general hash imprint GHV representing the content of the hash file HF in which the hash imprint H1 is now located. Assuming that this general hash imprint GHV already has an unspecified value prior to the steps S16, this value is updated by the third recording module MST3 during the step S16.

During an elimination step S18, the elimination module MS eliminates the non-encrypted file DF1 from the secured memory M2 so as to free up a memory space therein. In one particular example, the elimination module MS furthermore eliminates (S18), after the encryption step S8, the derived key DK1 in the secured memory M2 in order to free up more memory space therein.

It will be understood that the implementation of this embodiment is not limited to the order of execution as shown in FIG. 3. In particular, the steps S12 to S16 can be carried out before (or in parallel with) the steps S6-S10 or even before (in parallel with) the step S4.

The present technique thus enables the secured recording of the data in the terminal 2 while limiting the memory space used for this purpose in the secured memory M2. To this end, the data are recorded in encrypted form in the non-secured memory. These same data are removed from the secured memory M2 in order to gain memory space. The root key, from which the data are encrypted, is recorded in the secured memory of the terminal so that it is not possible for a malicious third party to easily decrypt the data recorded in encrypted form in the non-secured memory M1.

As explained here below, the implementing and recording of the hash file HF and of the general hash imprint GHV (respectively in M1 and M2) furthermore makes it possible to achieve reliable control over the integrity of the data recorded in encrypted form in the non-secured memory M1.

Following the secured recording method S4-S18 described here above, a user can advantageously access data DD present in encrypted form in the non-secured memory M1 without endangering the confidentiality of said data.

Figure 4:
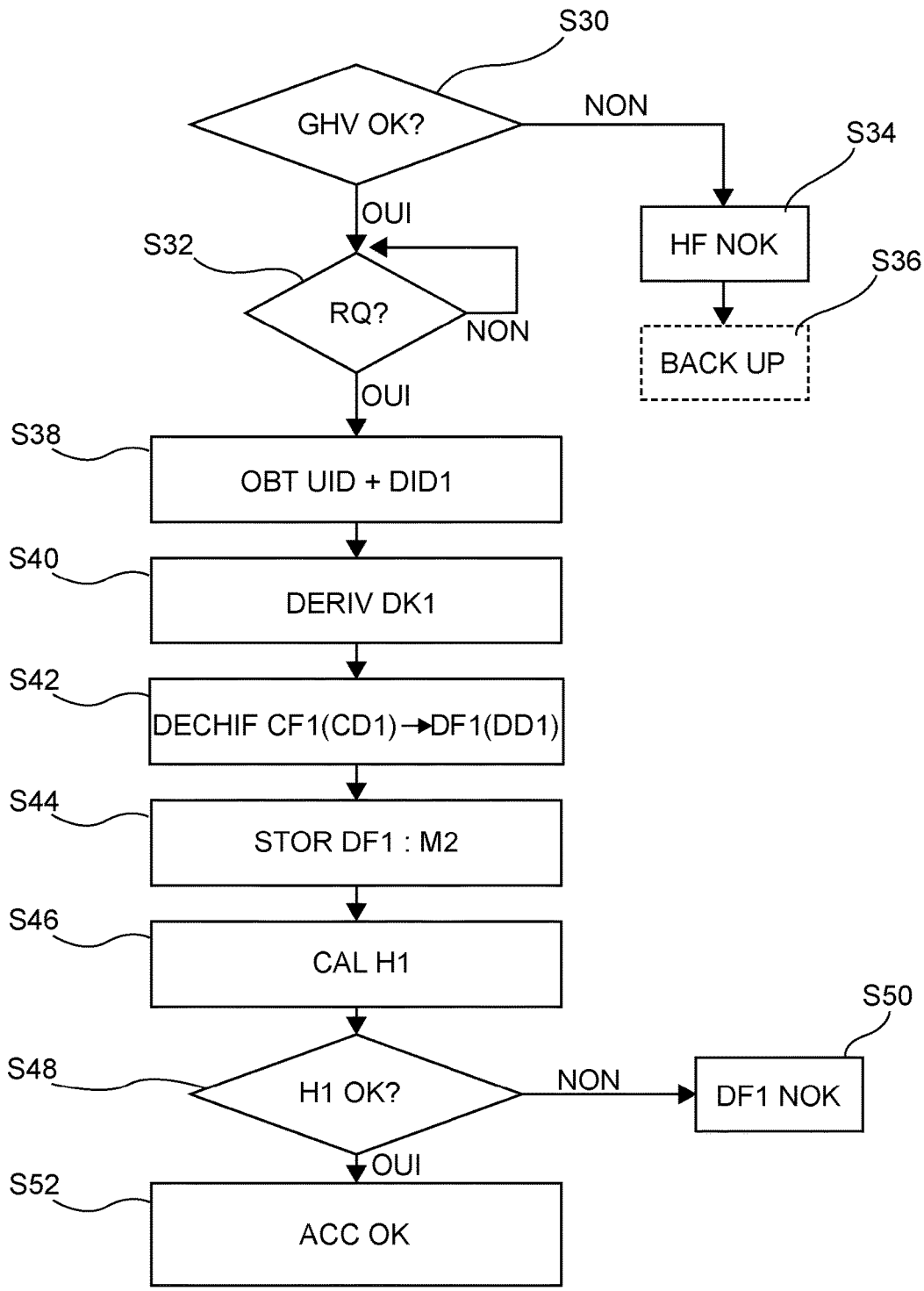
FIG. 4 is a flowchart representing the steps of a method for the secured retrieval of data according to one particular embodiment of the invention.

To this end, a description is now provided with reference to FIG. 4 of a method for the secured retrieval of data in the steps S38-S48 that is done after the method for the secured recording of data in the steps S4-S18. This method for the secured retrieval of data is implemented by the terminal 2 according to one particular embodiment. In the example described here, the terminal 2 implements a method of secured retrieval of data by executing the computer program PG.

More specifically, after the secured recording method S4-S18, the processor 4 verifies (S30) the integrity of the hash file HF from the general hash imprint GHV recorded in the secured memory M2. To this end, the processor 4 computes the general hash imprint of the hash file HF and verifies that the general hash imprint thus computed is in agreement or concordance with the general hash imprint GHV recorded in the secured memory M2. In one particular example, the processor 4 proceeds systematically to the step S30 when the terminal 2 is booted up or when a particular application is implemented in the terminal 2.

In the event of agreement at the verification step S30, the processor 4 implements the step S32 for determining access to the data. If not, the processor 4 implements the step for determining that the hash file HF is invalid. Such an absence of agreement reflects the probable deterioration (possibly malicious deterioration) of the hash file HF between the recording step S14 of the hash file HF as described here above and the present verification S30.

As indicated above, according to one variant of the invention, the processor 4 can have preliminarily recorded a copy of the hash file HF in the secured back-up memory 6 following the recording step S14. In this case, following the step S34 for detecting the invalidity of the hash file HF in the memory M1, the processor 4 can then (S36) retrieve said copy of the hash file HF in the back-up memory 6. Once this retrieval S36 has been done, the processor 4 can be configured to replace the invalid hash file HF contained in the non-secured memory M1 by the copy of the hash file HF coming from the back-up memory 6. The processor 4 can then proceed to the step S32 and the steps that follow it as indicated here below. Since the back-up memory 6 is secured here, the processor 4 thus has the capacity to retrieve a copy of the hash file HF having full integrity in the event of an attack on the integrity of the original hash file recorded in the non-secured memory M1.

During the step for determining S32, the processor 4 determines whether the access to the encrypted data CD1 recorded in the memory M1 is required. When a request for access RQ to the data DD1 is received by the processor 4, this processor carries out the steps S38-S52 described here below with reference to FIG. 4.

It is assumed here that the request for access RQ received by the terminal 2 comprises the user identifier UID and the identifier DID1 of the data DD1 which an authorized user (the one identified by UID) wishes to access.

During a retrieval step S38, the processor 4 retrieves the identifier of the user UID and the identifier DID1 of the data DD1.

Then, from the root key RK recorded in the secured memory M2, the processor 4 obtains (S40) the derived key DK1 corresponding to the encrypted data CD1 recorded in the non-secured memory M1. In this particular example, the processor 4 determines the key DK1 derived from the root key RK by using the user identifier UID and the data DD1 identifier DID1 retrieved at the retrieval step S38.

Advantageously, to the extent that the user identifier UID and data identifier DID are constant, the derived key DK1 determined from the root key, is always the same whatever the time when it is computed (it being understood that the root key RK remains unchanged in the secured memory M2).

Again in this example, the processor 4 records the derived key DK1 in the secured memory M2.

Then, from the derived key DK1, the processor 4 decrypts (S42) the encrypted data CD1 of the file CF1 so as to retrieve the data DD1 in their non-encrypted form. These pieces of data DD1 are recorded (S44) as a non-encrypted file DF1 in the secured memory M2.

In the embodiment described here, the decryption S42 is done directly in the secured memory M2. In other words, the data DD1 delivered during the decryption S42 are directly recorded in the secured memory M2 (without the intermediate recording of the data DD1 in another memory before the recording S44 in the secured memory M2).

Besides, the processor 4 determines (S46) the hash imprint of the data DD1 retrieved at S42 and then verifies (S48) the integrity of this data DD1 in the memory M2 in comparing the hash imprint determined in the determining step S46 with the hash imprint H1 recorded in the hash file HF in association with the data DD1.

In the event of agreement at the verification step S48, the processor 4 implements the authorization step S52. If not, the processor 4 determines (S50) that the data DD1 retrieved in the secured memory M2 at the step S44 is invalid, and the method then comes to an end.

During the authorization step S52, the processor 4 authorizes access to the data DD1 in the secured memory M2 in response to the access request RQ received at the step S32. In other words, the processor 4 authorizes access to the data DD1 retrieved in the memory M2 at the step S44 only if the verification of integrity S48 has taken place with success.

The present invention thus advantageously enables access to data recorded in the non-secured memory M1 without compromising the confidentiality of said data. During the method, at no time is the data presented in non-encrypted (clear) form in the non-secured memory M1. The invention furthermore enables reliable verification that the data accessed, if need be, in the secured memory has full integrity.

Figure 5:
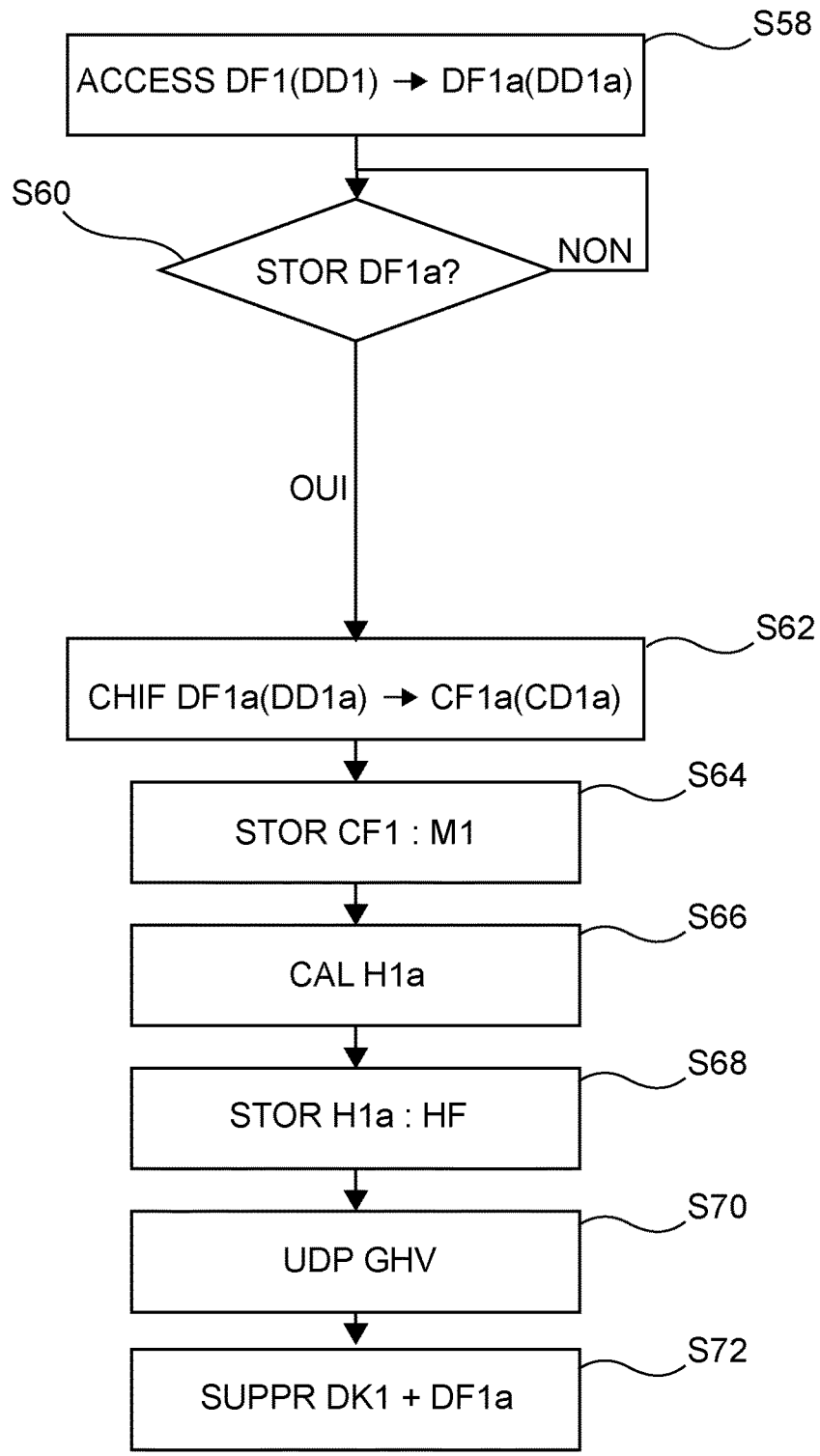
FIG. 5 is a flowchart representing a method for the secured recording of data according to one particular embodiment of the invention.

Referring now to FIG. 5, we describe a method of secured recording implemented by the terminal 2 on the data DD1, once the access to the data SD1 is terminated.

More specifically, it is now assumed that, following the authorization granted at the authorization step S52, the user in question has accessed (S58) the data DD1 recorded in the form of a non-encrypted file DF1 in the secured memory M2.

During the access S58 of the user to the data DD1 in the memory M2, said data DD1 are liable to be modified (write access). Thus, following the access S58, these data are denoted as DD1$a$ and the non-encrypted file comprising said data DD1$a$ has been denoted as DF1$a$ (as shown in FIG. 5).

During a determining step S60, the processor 4 determines whether a new method must be carried out for the secured recording of the data DD1$a$ present in the secured memory M2. If this is the case, the processor 4 proceeds to the steps S62-S72 described here below. In the example considered here, the processor 4 proceeds to the steps S62-S72 when access to the data DD1$a$ is terminated (or alternatively upon reception of a request from the user).

At the steps S62-S72, the processor 4 respectively repeats the step S8 for encrypting the data, the step S10 for recording the data, the step S12 for determining a hash imprint, the step S14 for recording the hash imprint, the step S16 for recording (or updating) the general hash imprint and the step S18 for eliminating the data (and preferably also the derived key DK1) as defined here above with reference to FIG. 3.

More specifically, the encryption module ME, using the derived key DK1, encrypts (S62) the data DD1$a$ of the memory M2 as encrypted data CD1$a$, the latter being recorded (S64) by the recording module MST1 in the form of an encrypted file CF1$a$ in the non-secured memory M1. It must be noted that, during the encryption step S62, the encryption module ME herein uses the derived key DK1 which has been preliminarily recorded in the secured memory M2 during the secured retrieval method described earlier (step S40). As an alternative, the derived key DK1 can again be determined from the identifiers UID and DID1.

The determining module MD furthermore determines (S66) the hash imprint, now denoted as H1$a$, of the non-encrypted file DF1$a$ recorded in the secured memory M2. The recording module MST2 then records (S68) the hash imprint H1$a$ in the file HF in association with the data DD1$a$ (for example with the identifier DID1).

The recording module MST3 also updates (S70) the general hash imprint GHV in the secured memory M2 so that it represents the contents of the hash file HF now comprising the hash imprint H1$a$.

During the elimination step S72, the elimination module MS also eliminates the non-encrypted file DF1$a$ and preferably the derived key DK1 in the secured memory M2.

Advantageously, the invention also enables the consultation and possible modification of the data recorded in encrypted form in the non-secured memory of the data-recording device and does so without compromising the confidentiality of the data in question and in ensuring that the data to which access is obtained have integrity.

Figure 6:
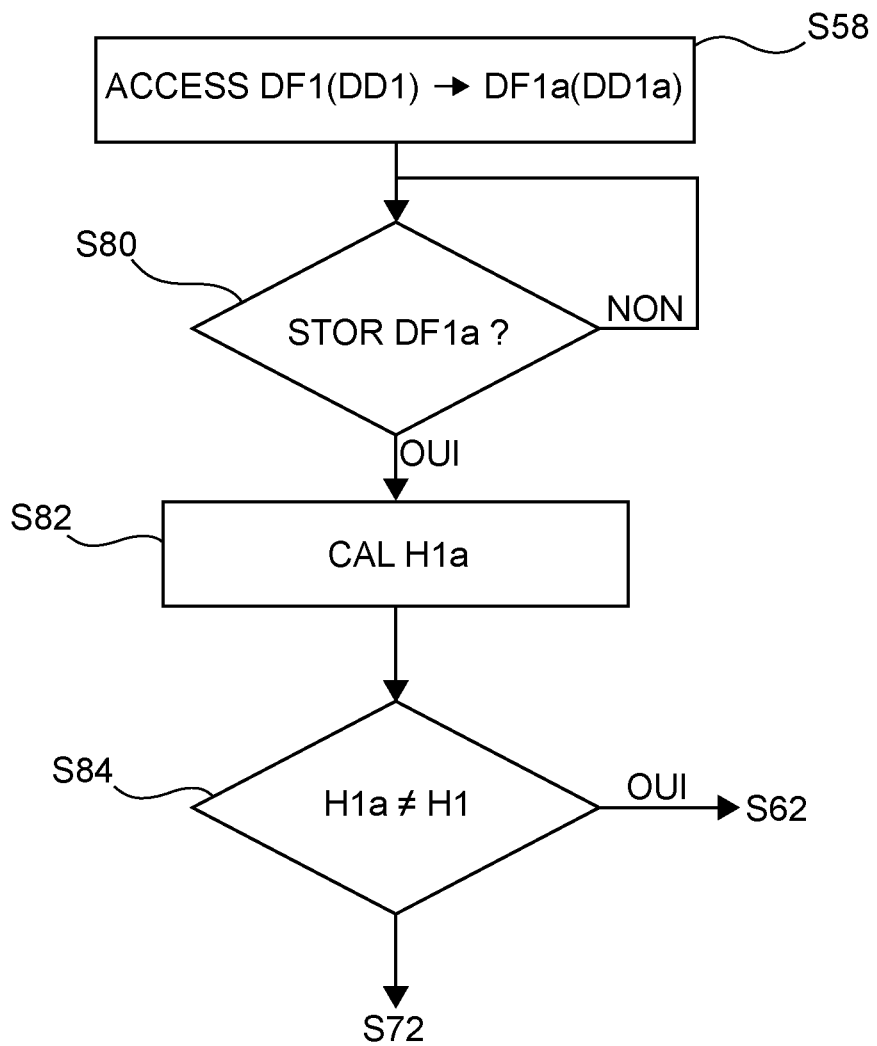
FIG. 6 is a flowchart representing a method for the secured recording of data according to another embodiment of the invention.

One alternative embodiment of the steps S62-S72 is now described with reference to FIG. 6.

It is assumed here too that an access S58 to the data DD1 in the secured memory M2 has taken place as described here above with reference to FIG. 5.

According to this alternative embodiment, the processor 4 then, at the step S60, determines whether a method of secured recording of the data DD1$a$ present in the secured memory M2 must be carried out in the same way as described here above with reference to FIG. 5. If the answer is yes, then the processor 4 implements the determining step S82.

During the determining step S82, the determining module ME determines the hash imprint denoted as H1$a$ of the data DD1$a$ recorded in the secured memory M2, following the access S58. In this example, the processor 4 records the hash imprint H1$a$ in the secured memory M2.

The processor 4 compares (S84) the hash imprint H1$a$ determined at S82 with the hash imprint H1 recorded in the hash file HF in association with the data DD1 and determines (S84) whether these hash imprints H1a and H1 coincide with each other. If there is no concordance at the step S84, the processor 4 implements the encryption step S62 and executes the steps S62-S72 as described here above with reference to FIG. 5. By contrast, if the processor 4 detects at S84 that the hash imprints H1 and H1a coincide with one each other, it goes directly to the step S72 as described here above with reference to FIG. 5. In other words, the processor 4 repeats the step S62 for encrypting, step S64 for recording encrypted data, step S66 for determining a hash imprint, step S68 for recording said hash imprint and step S70 for recording (or updating) the general hash value as defined here above, only if it is detected, at the step S84, that the data DD1a are different from the data DD1 (which means that the data DD1 have been modified during the access S58).

This alternative embodiment is advantageous in that it prevents the superfluous repetition of certain steps of the secured recording method following access to data in the secured memory of the terminal. The result of this is a gain in time and efficiency as well as a saving of resources used in the terminal.

Those skilled in the art will understand that the embodiments and variants described here below constitute non-exhaustive examples of implementation of the invention. In particular, those skilled in the art will be able to envisage any combination whatsoever of the variants and embodiments described here above before responding to a particular need.

What is claimed is:

1. A method for the secured recording of data, implemented in a data-recording device comprising a first non-secured memory and a second secured memory, the method comprising:
    obtaining a derived key corresponding to the data recorded in the second secured memory from a root key recorded in the second secured memory;
    encrypting the data using the derived key, thereby delivering encrypted data;
    recording the encrypted data in the first non-secured memory;
    determining a hash imprint of said data by applying a hash function to the data recorded in the second memory;
    recording said hash imprint in association with the data in a hash file recorded in the first non-secured memory, the hash imprint for verifying the integrity of the data;
    determining a general hash imprint, representing the content of the hash file comprising the hash imprint, by applying another hash function to the hash file;
    recording the general hash imprint in the second secured memory, the general hash imprint for verifying the integrity of the hash file; and
    subsequently to said recording of the encrypted data in the first non-secured memory, eliminating the data from the second secured memory, the data having been previously encrypted.

2. The method according to claim 1 wherein, after it is obtained, the derived key is recorded in the second secured memory, the method furthermore comprises eliminating the derived key from the second secured memory after the encryption of said data.

3. The method according of claim 1, wherein the root key is generated randomly in the data-recording device.

4. The method according to claim 1 wherein, during the obtaining, the derived key is obtained from:
    a user identifier representing a user of the data-recording device; and
    a data identifier.

5. The method according to claim 4, wherein, during said recording of the encrypted data, said encrypted data are recorded in the first non-secured memory in the form of an encrypted file to which a file name is assigned comprising the user identifier and the data identifier.

6. The method according to claim 1, the method comprising, after said recording of the hash imprint in the hash file, recording a copy of the hash file in a secured back-up memory of the data-recording device.

7. A method for the secured retrieval of data, implemented in a data-recording device comprising a first non-secured memory and a second secured memory, the method comprising:
    determining a general hash imprint of a hash file recorded in the first non-secured memory by applying a hash function to the hash file;
    verifying the integrity of the hash file recorded in the first non-secured memory by comparing the general hash imprint determined for the hash file with a recorded general hash imprint recorded in the second secured memory; and
    when the hash file is detected as having integrity, upon reception of a request for access to data:
        obtaining a derived key corresponding to encrypted data recorded in the first non-secured memory, from a root key recorded in the second secured memory;
        decrypting the encrypted data using the obtained derived key so as to retrieve said data;
        recording said data in the second secured memory;
        determining a hash imprint of said data by applying another hash function to said data recorded in the second memory;
        verifying the integrity of the data recorded in the second secured memory by comparing the hash imprint determined for the data with a recorded hash imprint recorded in the hash file in association with said data; and
        authorizing access to the data in the second secured memory in response to said access request, only if the data has been determined as having integrity.

8. The method according to claim 7, the method comprising obtaining a user identifier representing a user of the data-recording device and a data identifier, in which the derived key is obtained from the root key by using the user identifier and the data identifier.

9. The method according to claim 7, the method comprising, subsequently to an access to the data:
    encrypting data using the derived key, delivering encrypted data;
    recording the encrypted data in the first non-secured memory;
    determining the hash imprint of said data;
    recording said hash imprint in association with the data in the hash file recorded in the first non-secured memory;
    recording the general hash imprint, representing the content of the hash file comprising said hash imprint, in the second secured memory; and
    subsequently to said recording of the encrypted data in the first non-secured memory, eliminating the data that has been encrypted from the second secured memory.

10. The method according to claim 7, the method further comprising after an access by the user to the data in the second secured memory:
    determining a second hash imprint of said data following said access; and comparing said second hash imprint with the hash imprint recorded in the hash file in association with the data, in order to detect whether the data have been modified during said access;
wherein, only if it has been detected that the data have been modified during said access:
encrypting data using the derived key, delivering encrypted data;
recording the encrypted data in the first non-secured memory;
determining the hash imprint of said data;
recording said hash imprint in association with the data in the hash file recorded in the first non-secured memory;
recording the general hash imprint, representing the content of the hash file comprising said hash imprint, in the second secured memory; and
subsequently to said recording of the encrypted data in the first non-secured memory, eliminating the data that has been encrypted from the second secured memory.

11. A data-recording device comprising:
a first non-secured memory;
a second secured memory; and
a processor configured to:
  obtain a derived key corresponding to data recorded in the second secured memory from a root key recorded in the second secured memory;
  encrypt, using the derived key, said data so as to deliver encrypted data;
  record the encrypted data in the first non-secured memory;
  determine a hash imprint of said data by applying a hash function to the data recorded in the second secured memory;
  record said hash imprint, in association with the data, in a hash file recorded in the first non-secured memory, the hash imprint for verification of the integrity of the data;
  determine a general hash imprint, representing the content of the hash file comprising the hash imprint, by applying another hash function to the hash file;
  record, in the second secured memory, the general hash imprint, the general hash imprint for verification of the integrity of the hash file; and
  after said recording of the encrypted data in the first non-secured memory, eliminate the data from the second secured memory, the data having been previously encrypted.

12. The data-recording device according to claim 11, wherein the processor is further configured to:
  record, in the second secured memory, said derived key obtained from the root key; and
  eliminate the derived key recorded in the second secured memory after the encryption of said data.

* * * * *